United States Patent
Hannon

(10) Patent No.: US 9,820,140 B2
(45) Date of Patent: *Nov. 14, 2017

(54) APPARATUS, SYSTEM, AND METHOD FOR DETECTING THE PRESENCE AND CONTROLLING THE OPERATION OF MOBILE DEVICES WITHIN A VEHICLE

(71) Applicant: Driving Management Systems, Inc., San Francisco, CA (US)

(72) Inventor: Marwan Hannon, San Francisco, CA (US)

(73) Assignee: DRIVING MANAGEMENT SYSTEMS, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/161,942

(22) Filed: May 23, 2016

(65) Prior Publication Data

US 2016/0269893 A1 Sep. 15, 2016

Related U.S. Application Data

(63) Continuation of application No. 14/195,276, filed on Mar. 3, 2014, now Pat. No. 9,379,805, which is a
(Continued)

(51) Int. Cl.
*H04W 24/00* (2009.01)
*H04W 4/00* (2009.01)
(Continued)

(52) U.S. Cl.
CPC ............... *H04W 8/22* (2013.01); *B60K 35/00* (2013.01); *B60K 37/06* (2013.01);
(Continued)

(58) Field of Classification Search
CPC ........................................................ H04W 4/04
(Continued)

(56) References Cited

U.S. PATENT DOCUMENTS 5,258,968 A 11/1993 Matsuda et al.
6,188,315 B1 2/2001 Herbert et al.
(Continued)

FOREIGN PATENT DOCUMENTS

CN 201347000 Y 11/2009
CN 101808273 A 8/2010
(Continued)

OTHER PUBLICATIONS

AlcoMate Premium AL7000 Breathalyzer Product Specifications, http://alcomate.net/index.php/model-al7000.html, Jun. 16, 2011.
(Continued)

*Primary Examiner* — Tilahun B Gesesse
(74) *Attorney, Agent, or Firm* — K&L Gates LLP

(57) ABSTRACT

An apparatus, system, and method for determining the presence of a mobile device located in a predetermined detection zone within a vehicle are disclosed. A detection module receives a communication signal, determines that the communication signal was transmitted by a mobile device located within a predetermined detection zone within a vehicle, and a control module transmits a control signal to the mobile device located within the predetermined detection zone. The system further includes a monitoring logic to monitor a functional system of the vehicle activating the transmission of the control signal by the control module when the monitored functional system is activated and the detection module determines that the communication signal was transmitted by the mobile device located within the predetermined detection zone.

19 Claims, 5 Drawing Sheets

US 9,820,140 B2

Page 2

Related U.S. Application Data continuation of application No. 13/041,209, filed on Mar. 4, 2011, now Pat. No. 8,718,536.

(60) Provisional application No. 61/433,854, filed on Jan. 18, 2011.

(51) Int. Cl.

| H04W 8/22 | (2009.01) |
|---|---|
| B60K 35/00 | (2006.01) |
| B60K 37/06 | (2006.01) |
| H04K 3/00 | (2006.01) |
| H04W 4/02 | (2009.01) |
| H04W 4/04 | (2009.01) |
| H04W 48/04 | (2009.01) |
| H04L 29/08 | (2006.01) |
| H04B 7/185 | (2006.01) |
| H04W 64/00 | (2009.01) |
| H04W 8/24 | (2009.01) |
| H04W 48/02 | (2009.01) |

(52) U.S. Cl.
CPC ......... *H04B 7/18506* (2013.01); *H04K 3/415* (2013.01); *H04K 3/45* (2013.01); *H04L 67/24* (2013.01); *H04W 4/021* (2013.01); *H04W 4/046* (2013.01); *H04W 48/04* (2013.01); *B60K 2350/352* (2013.01); *B60K 2350/355* (2013.01); *B60K 2350/357* (2013.01); *H04K 2203/16* (2013.01); *H04K 2203/22* (2013.01); *H04W 4/02* (2013.01); *H04W 8/245* (2013.01); *H04W 48/02* (2013.01); *H04W 64/00* (2013.01)

(58) Field of Classification Search
USPC ...................... 455/1, 456.1, 404.1
See application file for complete search history.

(56) References Cited

U.S. PATENT DOCUMENTS

| 6,556,810 | B2 | 4/2003 | Suzuki |
|---|---|---|---|
| 6,620,108 | B2 | 9/2003 | Duval et al. |
| 6,726,636 | B2 | 4/2004 | Der Ghazarian et al. |
| 6,728,542 | B2 | 4/2004 | Meda |
| 6,892,131 | B2 | 5/2005 | Coffee et al. |
| 6,901,264 | B2 | 5/2005 | Myr |
| 6,904,110 | B2 | 6/2005 | Trans et al. |
| 6,967,581 | B2 | 11/2005 | Karsten |
| 7,084,894 | B2 | 8/2006 | Van Brocklin et al. |
| 7,086,596 | B2 | 8/2006 | Meier et al. |
| 7,095,402 | B2 | 8/2006 | Kunii et al. |
| 7,173,536 | B2 | 2/2007 | Duval |
| 7,200,409 | B1 | 4/2007 | Ichikawa et al. |
| 7,206,696 | B2 | 4/2007 | Furukawa |
| 7,215,944 | B2 | 5/2007 | Mecca |
| 7,218,236 | B2 | 5/2007 | Mobley et al. |
| 7,254,417 | B2 | 8/2007 | Slemmer et al. |
| 7,260,022 | B2 | 8/2007 | Schliep et al. |
| 7,260,221 | B1 | 8/2007 | Atsmon |
| 7,283,904 | B2 | 10/2007 | Benjamin et al. |
| 7,287,617 | B2 | 10/2007 | Mobley et al. |
| 7,292,936 | B2 | 11/2007 | Furukawa |
| 7,299,890 | B2 | 11/2007 | Mobley et al. |
| 7,319,455 | B2 | 1/2008 | Kunii et al. |
| 7,377,352 | B2 | 5/2008 | Mobley et al. |
| 7,379,083 | B2 | 5/2008 | Van Brocklin et al. |
| 7,413,047 | B2 | 8/2008 | Brown et al. |
| 7,426,689 | B2 | 9/2008 | Simonds et al. |
| 7,464,005 | B1 | 12/2008 | Beetner et al. |
| 7,481,292 | B2 | 1/2009 | Mobley et al. |
| 7,505,784 | B2 | 3/2009 | Barbera |
| 7,577,872 | B2 | 8/2009 | DiBartolomeo et al. |
| 7,582,196 | B2 | 9/2009 | Babes-Dornea et al. |
| 7,660,667 | B2 | 2/2010 | Furukawa |
| 7,690,572 | B2 | 4/2010 | Meier et al. |
| 7,698,062 | B1 | 4/2010 | McMullen et al. |
| 7,714,832 | B2 | 5/2010 | Tong et al. |
| 7,728,755 | B1 | 6/2010 | Jocic |
| 7,729,709 | B1 | 6/2010 | Loeb et al. |
| 7,820,108 | B2 | 10/2010 | Lampotang et al. |
| 7,841,224 | B2 | 11/2010 | Son |
| 7,856,203 | B2 | 12/2010 | Lipovski et al. |
| 7,876,205 | B2 | 1/2011 | Catten et al. |
| 7,887,089 | B2 | 2/2011 | Breed et al. |
| 7,891,456 | B2 | 2/2011 | Takahashi et al. |
| 7,925,243 | B2 | 4/2011 | McGary |
| 7,934,577 | B2 | 5/2011 | Walter et al. |
| 7,966,215 | B1 | 6/2011 | Myers et al. |
| 7,976,092 | B2 | 7/2011 | Meredith et al. |
| 7,991,654 | B1 | 8/2011 | Sacks et al. |
| 7,991,655 | B1 | 8/2011 | Sacks et al. |
| 7,991,656 | B1 | 8/2011 | Sacks et al. |
| 7,996,023 | B2 | 8/2011 | McGary et al. |
| 8,002,957 | B2 | 8/2011 | Grincourt et al. |
| 8,014,945 | B2 | 9/2011 | Cooper et al. |
| 8,016,196 | B2 | 9/2011 | Meier et al. |
| 8,032,764 | B2 | 10/2011 | Shankar et al. |
| 8,051,449 | B2 | 11/2011 | Kunii et al. |
| 8,065,051 | B2 | 11/2011 | Chopcinski et al. |
| 8,090,399 | B2 | 1/2012 | Howarter et al. |
| 8,095,065 | B2 | 1/2012 | Nagara et al. |
| 8,099,054 | B2 | 1/2012 | Tabe |
| 8,134,481 | B2 | 3/2012 | Ohki |
| 8,136,011 | B2 | 3/2012 | Cho et al. |
| 8,140,358 | B1 | 3/2012 | Ling et al. |
| 8,145,199 | B2 | 3/2012 | Tadayon et al. |
| 8,166,081 | B2 | 4/2012 | Christensen et al. |
| 8,179,271 | B2 | 5/2012 | Kamiki |
| 8,196,694 | B2 | 6/2012 | Biondo et al. |
| 8,201,437 | B2 | 6/2012 | Takata |
| 8,213,914 | B2 | 7/2012 | Kim et al. |
| 8,213,962 | B2 | 7/2012 | Carr |
| 8,233,775 | B2 | 7/2012 | Kunii et al. |
| 8,238,951 | B2 | 8/2012 | McGary |
| 8,239,831 | B2 | 8/2012 | Brennan et al. |
| 8,240,419 | B2 | 8/2012 | Zimmermann et al. |
| 8,249,627 | B2 | 8/2012 | Olincy et al. |
| 8,258,919 | B2 | 9/2012 | Corradino et al. |
| 8,258,968 | B2 | 9/2012 | Ghazarian et al. |
| 8,265,590 | B2 | 9/2012 | Sennett et al. |
| 8,270,933 | B2 | 9/2012 | Riemer et al. |
| 8,280,417 | B2 | 10/2012 | Venkatachalam et al. |
| 8,290,509 | B2 | 10/2012 | Jung et al. |
| 8,296,728 | B1 | 10/2012 | Webster |
| 8,315,597 | B2 | 11/2012 | Olincy et al. |
| 8,326,635 | B2 | 12/2012 | Usher et al. |
| 8,340,730 | B2 | 12/2012 | Pallotta |
| 8,346,310 | B2 | 1/2013 | Boll et al. |
| 8,359,014 | B2 | 1/2013 | Olincy et al. |
| 8,374,636 | B2 | 2/2013 | McDonough |
| 8,377,705 | B2 | 2/2013 | Lambert et al. |
| 8,401,578 | B2 | 3/2013 | Inselberg |
| 8,401,589 | B2* | 3/2013 | Liu ................. H04W 4/008 455/456.1 |
| 8,401,848 | B2 | 3/2013 | Dowlatkhah |
| 8,412,123 | B2 | 4/2013 | Foster |
| 8,413,217 | B2 | 4/2013 | Bhatia |
| 8,417,268 | B1 | 4/2013 | Halferty et al. |
| 8,442,447 | B2 | 5/2013 | Veluppillai et al. |
| 8,479,864 | B2 | 7/2013 | White et al. |
| 8,594,041 | B2 | 11/2013 | Mecca |
| 8,686,864 | B2 | 4/2014 | Hannon |
| 8,706,143 | B1 | 4/2014 | Elias |
| 8,718,536 | B2 | 5/2014 | Hannon |
| 9,209,909 | B2 | 12/2015 | Booij et al. |
| 9,280,145 | B2 | 3/2016 | Hannon |
| 9,369,196 | B2 | 6/2016 | Hannon |
| 9,379,805 | B2 | 6/2016 | Hannon |
| 2002/0132646 | A1 | 9/2002 | Girod |
| 2002/0156602 | A1 | 10/2002 | Kunii et al. |
| 2003/0086515 | A1 | 5/2003 | Trans et al. |

(56) References Cited

U.S. PATENT DOCUMENTS

| | | |
|---|---|---|
| 2003/0222144 A1 | 12/2003 | Meier et al. |
| 2004/0083031 A1 | 4/2004 | Okezie |
| 2004/0124697 A1 | 7/2004 | MacGregor et al. |
| 2004/0267607 A1 | 12/2004 | Maddux |
| 2005/0050209 A1 | 3/2005 | Main, II |
| 2005/0064922 A1 | 3/2005 | Owens et al. |
| 2005/0186933 A1 | 8/2005 | Trans |
| 2005/0261824 A1 | 11/2005 | Furukawa |
| 2005/0261829 A1 | 11/2005 | Furukawa |
| 2006/0033628 A1 | 2/2006 | Duval |
| 2006/0058951 A1 | 3/2006 | Cooper et al. |
| 2006/0058952 A1 | 3/2006 | Cooper et al. |
| 2006/0058953 A1 | 3/2006 | Cooper et al. |
| 2006/0080031 A1 | 4/2006 | Cooper et al. |
| 2006/0080032 A1 | 4/2006 | Cooper et al. |
| 2006/0099940 A1 | 5/2006 | Pfleging et al. |
| 2006/0205394 A1 | 9/2006 | Vesterinen |
| 2006/0224945 A1 | 10/2006 | Khan et al. |
| 2006/0240860 A1 | 10/2006 | Benco et al. |
| 2006/0265508 A1 | 11/2006 | Angel et al. |
| 2007/0032225 A1 | 2/2007 | Konicek et al. |
| 2007/0088495 A1 | 4/2007 | Ibrahim |
| 2007/0130153 A1 | 6/2007 | Nachman et al. |
| 2007/0136068 A1 | 6/2007 | Horvitz |
| 2007/0182595 A1 | 8/2007 | Ghasabian |
| 2007/0188472 A1 | 8/2007 | Ghassabian |
| 2007/0196078 A1 | 8/2007 | Kunii et al. |
| 2007/0288164 A1 | 12/2007 | Gordon et al. |
| 2008/0009296 A1 | 1/2008 | Han |
| 2008/0123580 A1 | 5/2008 | Vathulya |
| 2008/0147314 A1 | 6/2008 | Cubillo |
| 2008/0168398 A1 | 7/2008 | Geelen et al. |
| 2008/0182598 A1 | 7/2008 | Bowman |
| 2008/0186895 A1* | 8/2008 | Shang .................. H04L 29/06 370/312 |
| 2008/0208447 A1 | 8/2008 | Geelen et al. |
| 2009/0012704 A1 | 1/2009 | Franco et al. |
| 2009/0024707 A1 | 1/2009 | Aase et al. |
| 2009/0028179 A1 | 1/2009 | Albal |
| 2009/0075139 A1 | 3/2009 | Kucernak et al. |
| 2009/0083035 A1 | 3/2009 | Huang et al. |
| 2009/0089293 A1 | 4/2009 | Garritano et al. |
| 2009/0112572 A1 | 4/2009 | Thorn |
| 2009/0146848 A1 | 6/2009 | Ghassabian |
| 2009/0177736 A1 | 7/2009 | Christensen et al. |
| 2009/0215387 A1 | 8/2009 | Brennan et al. |
| 2009/0215466 A1 | 8/2009 | Ahl et al. |
| 2009/0238386 A1 | 9/2009 | Usher et al. |
| 2009/0253423 A1 | 10/2009 | Kullberg |
| 2009/0255917 A1 | 10/2009 | Feichko et al. |
| 2009/0264161 A1 | 10/2009 | Usher et al. |
| 2009/0316529 A1 | 12/2009 | Huuskonen et al. |
| 2010/0004004 A1 | 1/2010 | Browne-Swinburne et al. |
| 2010/0009626 A1 | 1/2010 | Farley |
| 2010/0010740 A1 | 1/2010 | Nachman et al. |
| 2010/0035596 A1 | 2/2010 | Nachman et al. |
| 2010/0035632 A1 | 2/2010 | Catten |
| 2010/0039224 A1 | 2/2010 | Okude et al. |
| 2010/0062788 A1 | 3/2010 | Nagorniak |
| 2010/0082820 A1 | 4/2010 | Furukawa |
| 2010/0113073 A1 | 5/2010 | Schlesener et al. |
| 2010/0131304 A1 | 5/2010 | Collopy et al. |
| 2010/0164836 A1 | 7/2010 | Liberatore |
| 2010/0167716 A1* | 7/2010 | Howarter .............. H04W 8/245 455/419 |
| 2010/0199176 A1 | 8/2010 | Chronqvist |
| 2010/0236924 A1 | 9/2010 | Chapples et al. |
| 2010/0251804 A1 | 10/2010 | Morley et al. |
| 2010/0269566 A1 | 10/2010 | Carroll et al. |
| 2010/0279626 A1 | 11/2010 | Bradley et al. |
| 2010/0297929 A1 | 11/2010 | Harris |
| 2010/0306309 A1 | 12/2010 | Santori et al. |
| 2010/0311345 A1 | 12/2010 | Santori et al. |
| 2010/0322293 A1 | 12/2010 | Rhodes et al. |
| 2010/0331051 A1 | 12/2010 | Kim et al. |
| 2010/0332226 A1 | 12/2010 | Lee et al. |
| 2011/0015934 A1 | 1/2011 | Rowe et al. |
| 2011/0021213 A1* | 1/2011 | Carr .................... H04B 5/0031 455/456.4 |
| 2011/0021234 A1 | 1/2011 | Tibbitts et al. |
| 2011/0029869 A1 | 2/2011 | McLennan |
| 2011/0032096 A1 | 2/2011 | Miller et al. |
| 2011/0045813 A1 | 2/2011 | Choi |
| 2011/0045839 A1 | 2/2011 | Chao |
| 2011/0063098 A1 | 3/2011 | Fischer et al. |
| 2011/0065375 A1 | 3/2011 | Bradley |
| 2011/0079073 A1 | 4/2011 | Keays |
| 2011/0084807 A1 | 4/2011 | Logan et al. |
| 2011/0086668 A1 | 4/2011 | Patel |
| 2011/0093474 A1 | 4/2011 | Etchegoyen |
| 2011/0094807 A1* | 4/2011 | Pruitt .................... B60K 1/04 180/65.6 |
| 2011/0102160 A1 | 5/2011 | Heubel et al. |
| 2011/0105084 A1 | 5/2011 | Chandrasekaran |
| 2011/0111724 A1* | 5/2011 | Baptiste .............. H04M 1/6075 455/404.1 |
| 2011/0133919 A1 | 6/2011 | Evarts et al. |
| 2011/0143786 A1 | 6/2011 | Fan et al. |
| 2011/0153742 A1 | 6/2011 | Sloop et al. |
| 2011/0175930 A1 | 7/2011 | Hwang et al. |
| 2011/0187646 A1 | 8/2011 | Mahmoud |
| 2011/0207441 A1 | 8/2011 | Wood |
| 2011/0212737 A1 | 9/2011 | Isidore |
| 2011/0219080 A1* | 9/2011 | McWithey ........ H04M 1/72552 709/206 |
| 2011/0230165 A1* | 9/2011 | Kleve .................. B60R 25/102 455/411 |
| 2011/0263293 A1* | 10/2011 | Blake .................. B60K 35/00 455/557 |
| 2011/0288764 A1 | 11/2011 | Sathish et al. |
| 2011/0304446 A1* | 12/2011 | Basson ................ B60K 28/063 340/438 |
| 2011/0304465 A1 | 12/2011 | Boult et al. |
| 2011/0306304 A1 | 12/2011 | Forutanpour et al. |
| 2012/0032876 A1 | 2/2012 | Tabe |
| 2012/0034954 A1 | 2/2012 | Tabe |
| 2012/0035923 A1* | 2/2012 | Krause ................ H04W 4/18 704/235 |
| 2012/0052854 A1 | 3/2012 | DiMeo et al. |
| 2012/0055726 A1* | 3/2012 | Hannon ................ H04K 3/415 180/272 |
| 2012/0064924 A1 | 3/2012 | Schapsis et al. |
| 2012/0066638 A1 | 3/2012 | Ohri |
| 2012/0109451 A1* | 5/2012 | Tan .................... G01C 21/3664 701/36 |
| 2012/0110126 A1 | 5/2012 | Sparks |
| 2012/0119936 A1 | 5/2012 | Miller et al. |
| 2012/0122525 A1 | 5/2012 | Miller et al. |
| 2012/0136503 A1 | 5/2012 | Schunder |
| 2012/0136529 A1 | 5/2012 | Curtis et al. |
| 2012/0140147 A1 | 6/2012 | Satoh et al. |
| 2012/0157069 A1 | 6/2012 | Elliott et al. |
| 2012/0176237 A1 | 7/2012 | Tabe |
| 2012/0236136 A1 | 9/2012 | Boddy |
| 2012/0244883 A1 | 9/2012 | Tibbitts et al. |
| 2012/0265535 A1 | 10/2012 | Bryant-Rich et al. |
| 2012/0283894 A1 | 11/2012 | Naboulsi |
| 2012/0284659 A1 | 11/2012 | De Leon |
| 2013/0046562 A1 | 2/2013 | Taylor et al. |
| 2013/0084847 A1 | 4/2013 | Tibbitts et al. |
| 2013/0336094 A1 | 12/2013 | Gruteser et al. |
| 2016/0185217 A1 | 6/2016 | Hannon |

FOREIGN PATENT DOCUMENTS

| | | |
|---|---|---|
| CN | 201792751 U | 4/2011 |
| GB | 1401318 | 7/1975 |
| JP | S59220421 | 12/1984 |
| JP | 10200961 | 7/1998 |
| JP | H11-112413 A | 4/1999 |
| JP | 2000-230900 A | 8/2000 |
| JP | 2001202129 A | 7/2001 |
| JP | 2002-335584 A | 4/2002 |

(56) References Cited

FOREIGN PATENT DOCUMENTS

| | | |
|---|---|---|
| JP | 2004-249847 A | 9/2004 |
| JP | 2004338687 A | 12/2004 |
| JP | 2006304034 A | 11/2006 |
| JP | 2007-106277 A | 4/2007 |
| JP | 4034813 B2 | 1/2008 |
| JP | 2008-137624 | 6/2008 |
| JP | 2008-160715 A | 7/2008 |
| JP | 2009-035062 | 2/2009 |
| JP | 2009202745 A | 9/2009 |
| JP | 4351286 | 10/2009 |
| JP | 2009-284442 A | 12/2009 |
| KR | 10-1998-00440012 | 9/1998 |
| KR | 10-1999-0043676 | 6/1999 |
| KR | 2000-0001005 | 1/2000 |
| WO | WO 01/08328 A1 | 2/2001 |
| WO | WO 02/12883 A1 | 2/2002 |
| WO | WO 2004/018249 A1 | 3/2004 |
| WO | WO 2009/014703 A1 | 1/2009 |
| WO | WO 2015/070064 A1 | 5/2015 |

OTHER PUBLICATIONS

Breathalyzer—Wikipedia, the free encyclopedia, http://en.wikipedia.org/wiki/Breathalyzer, Jun. 16, 2011.
Bluetooth SIG, Bluetooth Specification Version 4.0 [vol. 0].
How Stuff Works: How Breathalyzers Work, Jun. 16, 2011.
Swerdlow, Alexej et al., "Speaker Position Estimation in Vehicles by Means of Acoustic Analysis," Fortschritte Der Akustik: DAGA, Mar. 2008 in Dresden, Mar. 2008.
Yang, et al., "Detecting Driver Phone Use Leveraging Car Speakers," MobiCom'11, Sep. 19-23, 2011, Las Vegas, Nevada, USA, 12 pages.

\* cited by examiner

APPARATUS, SYSTEM, AND METHOD FOR DETECTING THE PRESENCE AND CONTROLLING THE OPERATION OF MOBILE DEVICES WITHIN A VEHICLE

CROSS REFERENCE TO RELATED APPLICATION

This application is a continuation of U.S. patent application Ser. No. 14/195,276, filed Mar. 3, 2014, entitled "APPARATUS, SYSTEM, AND METHOD FOR DETECTING THE PRESENCE AND CONTROLLING THE OPERATION OF MOBILE DEVICES WITHIN A VEHICLE," which is a continuation of U.S. patent application Ser. No. 13/041,209, filed on Mar. 4, 2011, entitled "APPARATUS, SYSTEM, AND METHOD FOR DETECTING THE PRESENCE AND CONTROLLING THE OPERATION OF MOBILE DEVICES WITHIN A VEHICLE," now U.S. Pat. No. 8,718,536, which claimed the benefit of U.S. Provisional Pat. Appl. No. 61/433,854, filed Jan. 18, 2011, entitled "APPARATUS, SYSTEM, AND METHOD FOR DETECTING THE PRESENCE AND CONTROLLING THE OPERATION OF MOBILE DEVICES WITHIN A VEHICLE," each of which are hereby incorporated by reference in their entireties.

BACKGROUND

Mobile devices such as wireless devices, including, for example, cellular telephones, smart phones, laptop computers, notebook computers, tablet devices (e.g., iPad by Apple®) are ubiquitous in modern society. Use of such mobile devices while operating a vehicle, however, can be hazardous. The problem is exacerbated for inexperienced operators of the vehicle, such as youngsters just learning how to drive. Rates of vehicular accidents where mobile devices are involved are rising, especially with teenagers. Text messaging while operating a moving vehicle can be dangerous and has been linked with causing accidents. More generally, operating any keyboard while operating a vehicle can be dangerous.

Thus, the widespread adoption of mobile devices and common use of the devices while driving has raised concerns about the distraction of drivers. A driver speaking or text messaging on a mobile telephone may become mentally distracted from driving and lose control of the vehicle that he or she is driving. Thus, it is not uncommon to see an individual involved in an accident who was speaking or text messaging on a mobile device rather than paying attention to the road. Studies now suggest that individuals speaking on mobile telephones while driving a car may be as impaired as a person who drives while intoxicated. Not only is the driver mentally distracted, but eyes of the driver are diverted for dialing, looking to see who an incoming call is from.

It would be highly desirable to detect the presence of a mobile device such as a wireless device within a vehicle and control or disable the operation of the mobile device.

SUMMARY

In one embodiment, a method for determining the presence of a mobile device located in a predetermined detection zone within a vehicle is provided. A detection module receives a communication signal. The detection module determines that the communication signal was transmitted by a mobile device located within a predetermined detection zone within a vehicle. A control module transmits a control signal to the mobile device located within the predetermined detection zone.

FIGURES

DESCRIPTION

The present disclosure describes embodiments of an apparatus, system, and method for detecting the presence of a mobile device such as a wireless device and controlling or disabling the operation of the mobile device when it is detected. In particular, the present disclosure is directed to embodiments of an apparatus, system, and method for detecting the presence of a mobile device such as a wireless device in a predetermined location within a vehicle and disabling some or all of the functions of the mobile device when it is detected in the predetermined location. More particularly, the present disclosure is directed to automatically preventing a person in the driver's seat of a vehicle from text messaging and doing other similar excessively dangerous activities with the mobile device.

It is to be understood that this disclosure is not limited to particular aspects or embodiments described, as such may vary. It is also to be understood that the terminology used herein is for the purpose of describing particular aspects or embodiments only, and is not intended to be limiting, since the scope of the apparatus, system, and method for detecting the presence of a mobile device within a vehicle and controlling the operation of the mobile device when it is detected is defined only by the appended claims.

In one embodiment, the present disclosure provides an apparatus, system and method for detecting and restricting the use of mobile devices within a vehicle, whether the vehicle is moving or stationary. Mobile devices, such as wireless devices, may include without limitation, for example, cellular telephones, smart phones, laptop computers, notebook computers, tablet devices (e.g., iPad by Apple®), Netbook®, among other wireless mobile devices that a user can interact with while located in a vehicle. In one embodiment, the presence of a mobile device in the driver's side area of the vehicle is detected by at least one sensor located within the vehicle. When the presence of the mobile device is detected, the operation of the mobile device is controlled, disabled, or modified with respect to the person located in the driver side area of the vehicle but not with respect to other persons located in other areas of the vehicle.

Figure 1:
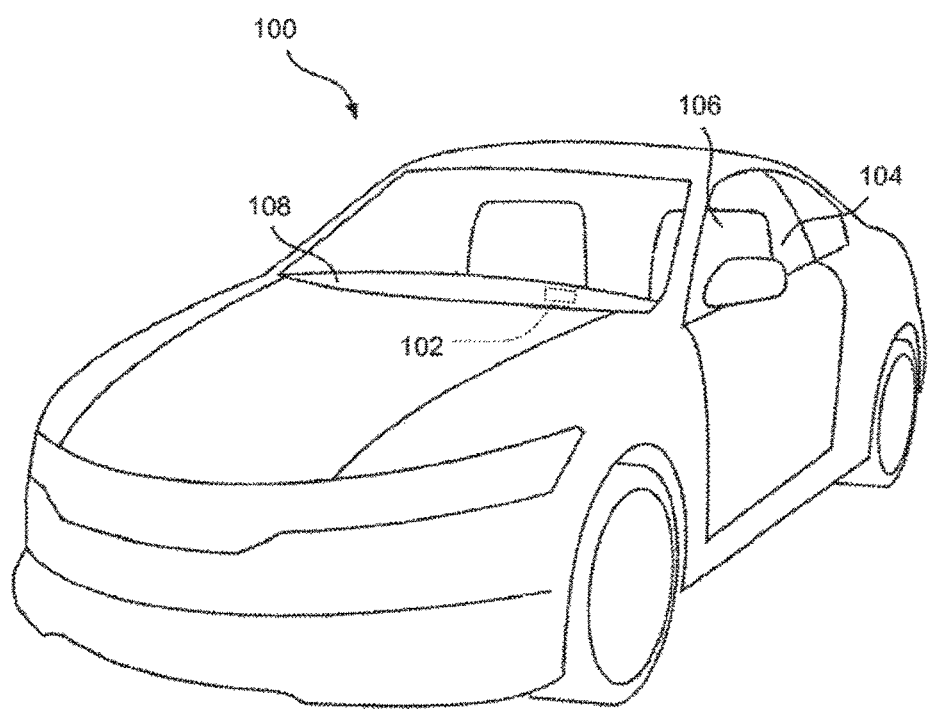
FIG. 1 illustrates a vehicle that includes a cabin for accommodating an individual in a driver seat.

FIG. 1 illustrates a vehicle 100 that includes a cabin 104 for accommodating an individual in a driver seat 106. It will be appreciated in accordance with the present disclosure that the term vehicle is used broadly and is meant to include any kind of transportation vehicle. For example, the vehicle 100 may be any type of automobile, truck, sport utility vehicle, aircraft, watercraft, spacecraft, or any other means of transportation, or combinations thereof, where communications by the driver using a mobile device is to be detected and controlled.

Disposed on or within the dashboard 108 of the vehicle 100 is a mobile device detection and control system 102. In one embodiment, the mobile device detection and control system 102 is configured to detect the presence of a mobile device located in the driver seat 106 side of the vehicle 100 and control the operation of the mobile device by either jamming the mobile device, jamming certain functions or aspects of the mobile device, or redirecting the operation of the mobile device to a hands-free alternate system. In other embodiments, at least some elements or components of the mobile device detection and control system 102 may be located in other areas of the vehicle 100.

It may be desirable to place detection and jamming elements of the mobile device detection and control system 102 as close to the driver as possible. For example, sensors and directional antennas of the mobile device detection and control system 102 may be located in proximity of the driver seat 106. This configuration provides the more precise detection of the presence of the mobile device in the driver seat 106 side of the vehicle 100 and prevents interference with other mobile devices or other persons located within the vehicle 100 to allow persons in the passenger seats to use the mobile device while the driver is unable to. Other elements or components such as control logic may be located in other locations of the vehicle 100 away from the driver seat 106.

In one embodiment, the mobile device detection and control system 102 is configured to detect signal transmissions from mobile devices located in or proximity of a detection zone. In accordance with the described embodiments, the detection zone is defined as a zone substantially in or in proximity of the driver seat 106 side of the vehicle 100. In other embodiments, however, the detection zone may be any predefined zone within the vehicle 100, without limitation. In one aspect, the detection portion of the mobile device detection and control system 102 may tuned to detect signal transmissions in frequency bands used by conventional mobile telephones operating in common cellular channels. Once the signals are detected, the mobile device detection and control system 102 wirelessly controls the operation of the mobile device in one or more ways. For example, in one embodiment, the mobile device detection and control system 102 transmits control signal to disable the operation of the mobile device by way of jamming signals that interfere with the communication mechanism of the mobile device. While the jamming signals are transmitted, the mobile device or other communication device within the detection zone is rendered either inoperable or operable only in a state of limited capacity. The jamming signals forcibly interfere with the communication mechanism of the mobile device by broadcasting noise or other signals on one or more channels used by the mobile device. In other embodiments, a jamming signal may be interpreted by the mobile device to disable one or more functions of the mobile device. In such an embodiment, the jamming signal may be communicated to the mobile device through a secondary channel, such as a Bluetooth wireless connection or any other connection that is secondary to the primary cellular communication channel. In some embodiments, the jamming module may communicate on the primary communication channel of the mobile device only or in addition to one or more secondary channels.

Accordingly, the mobile device detection and control system 102 can either completely block the ability to receive or send a call on a mobile device, or sufficiently interfere with the mobile device signal so as to make the mobile device usage undesirable. For example, if the jamming signal simply interrupts a sufficient portion of the conversation, the user will simply either postpone the conversation or pull over so the conversation can continue uninterrupted. In another embodiment, the mobile device detection and control system 102 may disable the operation of certain components or functions of the mobile device. For example, the keyboard portion of the mobile device may be jammed to prevent the user from using the text messaging function of the mobile device. In another embodiment, the mobile device detection and control system 102 may direct the operation of the mobile device to a hands-free operation. These and other embodiments are discussed in more detail hereinbelow.

In one embodiment, the mobile device detection and control system 102 initiates the detection process by transmitting probing signals to detect the presence of a mobile device within a detection zone. Once the probing signals are transmitted, the detection and control system 102 waits for an echo signal reflected by the mobile device or a response signal transmitted by the mobile device. If the detection and control system 102 detects the echo signal or a transmission by the mobile device, the detection and control system 102 transmits a control signal to control the operation of the mobile device. For example, in one embodiment, the detection and control system 102 transmits a control signal to disable the operation of the mobile device by way of jamming signals that interfere with the communication mechanism of the mobile device. In another embodiment, the detection and control system 102 may reroute communications to a hands-free system, such as a Bluetooth communication system.

Figure 2:
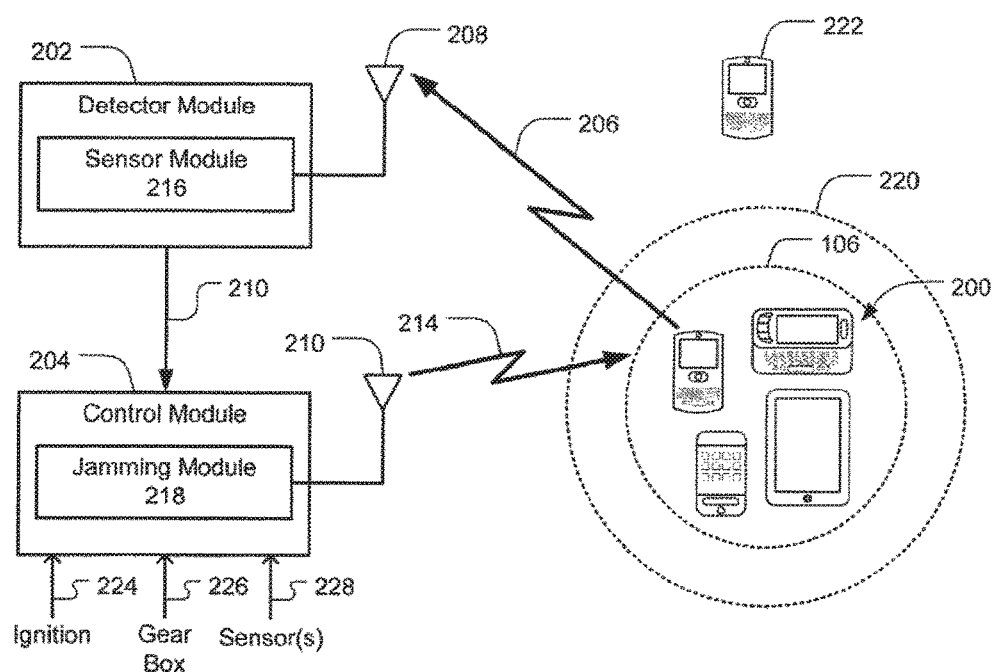
FIG. 2 illustrates one embodiment of a mobile device detection and control system.

FIG. 2 illustrates one embodiment of a mobile device detection and control system 102. In one embodiment, the mobile device detection and control system 102 is configured to detect the presence of a mobile device 200 located in or in proximity of the driver seat 106 area of the vehicle 100. Once the mobile device 200 is detected, the mobile device detection and control system 102 is configured to control the operation of the mobile device 200. In one embodiment, the mobile device detection and control system 102 comprises a detector module 202 and a control module 204 coupled to the detector module 202. The detector module 202 comprises a multi-band antenna 208 to receive signal transmissions from the mobile device 200 and the control module 204 comprises an antenna 210 to transmit control signal to the mobile device 200. In various embodiments, the detector module 202 and the control module 204 may share an antenna when these components are located in proximity of each other.

In various embodiments, the mobile device 200 may be implemented as a handheld portable device, computer, mobile telephone, sometimes referred to as a smartphone, tablet personal computer (PC), laptop computer, or any combination thereof. Examples of smartphones include, for example, Palm® products such as Palm® Treo® smartphones (now Hewlett Packard or HP), Blackberry® smart phones, Apple® iPhone®, Motorola Droid®, and the like.

Tablet devices include the iPad® tablet computer by Apple® and more generally a class of lightweight portable computers known as Netbooks. In some embodiments, the mobile device 200 may be comprise, or be implemented as, any type of wireless device, mobile station, or portable computing device with a self-contained power source (e.g., battery) such as a laptop computer, ultra-laptop computer, personal digital assistant (PDA) with communications capabilities, cellular telephone, combination cellular telephone/PDA, mobile unit, subscriber station, user terminal, portable computer, handheld computer, palmtop computer, wearable computer, media player, pager, messaging device, data communication device, and so forth.

In one embodiment, the detector module 202 is configured to detect presence of the mobile device 200 located within a detection zone 220 defined as a three-dimensional zone within or in proximity of the driver seat 106. Methods of detecting the presence of the mobile device 200 may vary based on the wireless technology communication standards used by the mobile device 200. Examples of wireless technology communication standards that may be used In the United States, for example, may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, 3G systems such as Wide-band CDMA (WCDMA), 4G systems, CDMA-2000, Universal Mobile Telephone System (UMTS) systems, Integrated Digital Enhanced Network (iDEN) (a TDMA/GSM variant) and so forth. These wireless communications standards are fully familiar to those of ordinary skill in the art. The frequency and signal strength of the radio frequency (RF) signals transmitted by the mobile device 200 depend on the network type and communication standard. The detector module 202 detects the RF signal, or simply electromagnetic energy radiation, transmitted by the mobile device 200, generally speaking. Accordingly, in one embodiment, the detector module 202 may be configured to lock onto specific cellular frequencies or cellular frequency bands or may be configured to scan all the available cellular frequencies or cellular frequency bands and lock onto the RF signal emitted by the mobile device 200.

In one embodiment, the detector module 202 may comprise a sensor module 216 coupled to the multi-band antenna 208. The sensor module 216 may be tuned to detect energy at a predetermined signal strength in the electromagnetic signal 206, e.g., RF signal, emitted by the mobile device 200 and received by the antenna 208. It will be appreciated that the signal strength or power of the energy radiated by the electromagnetic signal 206 emitted by the mobile device 200 will be greatest when the mobile device 200 is making an outbound call or otherwise communicating with a cellular base station (e.g., searching for base station signals or in contact with a base station or cell). Very little energy in the electromagnetic signal 206 is radiated when the mobile device 200 is turned off or when it is not communicating with the cellular base station. In the latter case, when the mobile device 200 is turned on but is not communicating with the cellular base station, the mobile device 200 possibly may be detected only if the detector module 202 comprises extremely sensitive components. Most conventional mobile devices 200 radiate energy at a power level ranging from about 0.5 milliwatts (mW) to about several hundred mW. A detector module 202 of suitable sensitivity can be configured to detect electromagnetic signals 206 in this range of power level. Many radio electronic equipment are capable of detecting low-level power in the electromagnetic signal 206 and is one reason why airlines are very sensitive about electronic equipment that operates at key points of the flight, why some electronic equipment should be turned off near blast sites, and why cellular phones should be turned off around some types of hospital equipment.

It is well known that a mobile device 200, such as, for example, a cellular telephone using the GSM standard, generates detectable radio interference. It is well known to users of GSM cellular telephones that if the cellular telephone is used in the vicinity of an electronic device (such as, for example, a radio receiver, stereo system, TV set, a wired/fixed telephone or even another GSM cell phone), the radio transmissions from the GSM cell phone may be inadvertently "picked up" by the electronic device and a signal proportional to the envelope of the radio transmission may be produced inside the electronic device. In fact, this typically unwanted signal may even disrupt the operation of the electronic device. For example, it is particularly well known that GSM cellular telephones present a potential hazard for wearers of heart pacemakers, as the GSM signal may disrupt proper pacemaker operation if the phone is very near to the wearer's chest.

In one embodiment, the sensor module 216 is configured to exploit the detectable radio interference of the electromagnetic signal 206 generated by the mobile device 200 when it is communicating with the cellular base station. When the sensor module 216 of the detector module 202 detects the electromagnetic signal 206, it assumes the presence of a mobile device 200 located within the detection zone 220, i.e., in or in proximity of the driver seat 106, and communicates a signal 212 to the control module 204. Disposed in communication with the control module 204 is a jamming module 218. In one embodiment, when the control module 204 receives the signal 212 from the detection module, the jamming module 218 transmits a jamming signal 214 via the antenna 210 that is detectable only by the mobile device 200 when located in the detection zone 220. In various embodiments, the electromagnetic jamming signal 214 may be a signal that disables the operation of the mobile device 200, may disable certain functionality of the mobile device 200, or may redirect the operation of the mobile device 200 to a hands-free operation. The control module 204 may be disposed in communication with a system of the vehicle 100, such as the ignition system 224, the gear box 226, or a variety of sensors 228. The control module 204 logic then monitors a function of a system of the vehicle 100 in addition to the detection of the presence of the mobile device 200. Accordingly, the jamming module 218 would be activated only when a monitored function of the vehicle 100 is activated. For example, when the sensor module 216 detects the presence of a mobile device 200 in the detection zone 220, the jamming module 218 would be activated only when the vehicle 100 is turned on, when the vehicle 100 is moved out of park or otherwise put in gear, or when one or more sensors detect that the operation of the vehicle 100.

In one embodiment, the sensor module 216 may comprise an energy harvester to harvest the energy in the electromagnetic signal 206 transmitted by the mobile device 200. The energy harvester receives the radiated energy at the antenna 208 and converts the energy into a voltage potential to energize the detector module 202 and communicate the signal 212 to the control module 204. In other embodiments, the energy harvester may be separate from the sensor module 216 and the voltage potential produced by the energy harvester may be used to energize the sensor module 216. In any embodiment, the voltage potential produced by the energy harvester is employed to determine the presence of a mobile device 200 in the detection zone 220. Accordingly, the sensitivity of the sensor module 216 is adjusted such that the energy harvester is sensitive only to the radiated energy levels that typically occur when the mobile device 200 is located within the detection zone 220 and not sensitive to electromagnetic energy transmitted by mobile devices 222 located outside the detection zone 220. In this manner, passengers can freely use their mobile devices 222 outside the detection zone 220 without triggering the detector module 202.

In other embodiments, the detector module 202 may be coupled to the electrical system of the vehicle 100 and powered by the vehicle battery, or may be powered by a separate battery. In such embodiments, the detector module 202 comprises a frequency scanning and power level measurement module that measures the power of the electromagnetic signal 206 transmitted by the mobile device 200. Accordingly, the sensitivity of the detector module 202 can be tuned to trigger the detection signal 212 when the detector module 202 detects transmit power levels that correspond to the mobile device 200 being located in the detection zone 220 without triggering the detection signal 212 for transmit power levels corresponding to the mobile devices 222 located outside the detection zone 220. This may be accomplished by strategically locating a directional multi-band antenna 208 such that it is maximally sensitive to transmit power level radiated by the mobile device 200 located in the detection zone 220 and minimally sensitive to transmit power levels to the mobile devices 222 located outside the detection zone 220.

In one embodiment, the control module 204 may comprise a communications jamming module 218 coupled to the antenna 210. The jamming module 218 is disposed in communication with the antenna 210. The antenna 210 emits a jamming signal 214 to thereby disrupt mobile device 200 signals and prevent or otherwise interfere with the ability to make or receive calls with the mobile device 200. The jamming module 218 and the antenna 210 may be powered by the electrical system of the vehicle 100, or may be powered by a separate battery. The jamming module 218 may be any device that transmits a jamming signal 214 that causes interference or inoperability of the mobile device 200. In some embodiments, the jamming module 218 may broadcast noise or a specialized signal that is selected to interfere with one or more of the communications frequencies of the mobile device 200. For example, the jamming module 218 may broadcast noise or a repeated interfering signal on the control channel frequencies for a cellular phone system. In some embodiments, the jamming module 218 may transmit on a narrow frequency band, while in other embodiments a very broad frequency band may be selected. The precise method for interfering with the mobile device 200 by the jamming module 218 is dependent on the transmission and reception characteristics of the mobile device 200. Those skilled in the art may use any appropriate jamming module 218 for any specific mobile device 200 device contemplated.

In accordance with one aspect, the jamming module 218 may be mounted in the vehicle 100. When activated, the jamming module 218 inhibits the ability to send or receive a mobile telephone call with a mobile terminal 200 located in the detection zone 220. Depending on the wattage of the jamming module 218 (or the use of a directional antenna), the zone in which the mobile device 200 is jammed may be controlled. Thus, for example, the jamming module 218 may be set to effectively jam telephone calls to or from the mobile device 200 for a space of 1-3 feet from the location of the jamming device 218, or in a direction which interferes with the ability of the driver to receive a telephone call, place a telephone call, or send a text message but not interfere with other passengers' ability to receive or initiate mobile telephone calls or send test messages.

In one embodiment, the antenna 210 may be positioned under the dashboard of the vehicle 100 or up on the driver side windshield. Alternatively, a directional antenna could be placed in the driver's seat to interfere with the driver making calls or sending text messages.

In one embodiment, the control module 204 may be used to prevent communications by the operator of the vehicle 100 when the mobile device 200 is detected in the detection zone 220 in combination with either an ignition switch, transmission switch, or other vehicular sensor mechanism. In one embodiment, an ignition switch may be monitored to cause the jamming module 218 to broadcast only when a mobile device 200 is detected in the driver seat 106 side of the vehicle 100 and the ignition switch is turned on, which would require the operator of the vehicle 100 to shut down the vehicle 100 to establish outside communications. The jamming module 218 would prevent any further communications until the vehicle 100 was switched off. In another embodiment, the jamming module 218 may be activated only when a mobile device 200 is detected in the detection zone 220 and an automatic transmission in the vehicle 100 is moved out of "park" and into a position where the vehicle 100 may move. When such a system is in place, the operator of the vehicle 100 must stop the vehicle 100 and either move the transmission to "park" or turn off the engine to operate the mobile device 200.

In one embodiment, the jamming module 218 may be configured to operate within the confines of the vehicle 100. In some cases, the antenna 210 coupled to the jamming module 218 of the control module 204 may be configured with a predetermined power level and directional attributes to direct the jamming signals 214 merely in the detection zone 220 such that other occupants of the vehicle 100 can continue to operate other mobile devices 222. In such cases, the jamming signals 214 may be generally confined within the detection zone 220 of the vehicle 100. In some embodiments, the jamming signals 214 may be localized to other areas within the vehicle 100 so that operation of a mobile device in that area is disabled, but leaving other mobile devices outside of that area operational.

In various embodiments, the antenna 210 and power level of the jamming signal 214 may be configured to deliver the jamming signal very precisely to the detection zone 220. In one embodiment, this may be implemented with a directional antenna located within the vehicle 100 where maximum jamming is delivered to the detection zone 220 and minimal jamming power is delivered outside the jamming zone 220. In such embodiments, the detector module 202 may be configured to indiscriminately detect any transmissions from all mobile devices 200, 222 within the vehicle 100 and the jamming module 218 would only transmit jamming signals to the detection zone 220 to jam the mobile device 200 within the detection zone 220 without affecting the mobile devices 22 outside the detection zone 220. Such implementation would not care whether or not a mobile device is located within the detection zone 220, thus simplifying the design of the detector module 202.

In one embodiment, the jamming module 218 may permit incoming calls to the mobile device 200 but prohibit outgoing calls to the mobile device 200. When the detector module 202 detects the energy in the electromagnetic signal 206 from an attempted outgoing call by the mobile device 200, the signal 212 activates the jamming signal 214. In such an embodiment, the detector module 202 may comprise additional modules to discern the identity of the mobile device 200 and enable the control module 204 to transmit the jamming signal 214 after the identity of the mobile device 200 is confirmed.

In other embodiments, the sensor module 216 may be used to detect and permit or deny any type of operation of the mobile device 200. For example, calls may be received by the mobile device 200 but placed calls may be jammed. In another example, some calls, such as emergency calls, may be permitted to be placed while other outgoing calls are jammed. Any other function of the mobile device 200 that may be detected may be selectively permitted or disabled by the jamming module 218.

In one embodiment, the mobile device 200 may receive the jamming signal 214 and operate in a reduced function mode. For example, the mobile device 200 may be prohibited from initiating a phone call except for emergency calls to 911. In another example, the mobile device 200 may be permitted to receive all calls or calls from a predefined list of callers while being prohibited from placing calls. Various reduced function modes may be used and in some embodiments a setting may define the precise operations allowed.

In one embodiment, control module 204 initiates the detection process by transmitting probing signals to detect the presence of a mobile device 200 within a detection zone 220. Once the probing signals are transmitted, the detector module 202 waits for an echo signal reflected by the mobile device 200 or a response signal transmitted by the mobile device 200. If the detector module 202 detects the echo signal or a transmission by the mobile device 200, the control module 204 transmits a control signal to control the operation of the mobile device 200. For example, in one embodiment, jamming module 218 transmits a control signal to disable the operation of the mobile device 200 by way of jamming signals 214 that interfere with the communication mechanism of the mobile device 200. In another embodiment, the control module 204 may reroute communications to a hands-free system, such as a Bluetooth communication system.

Figure 3:
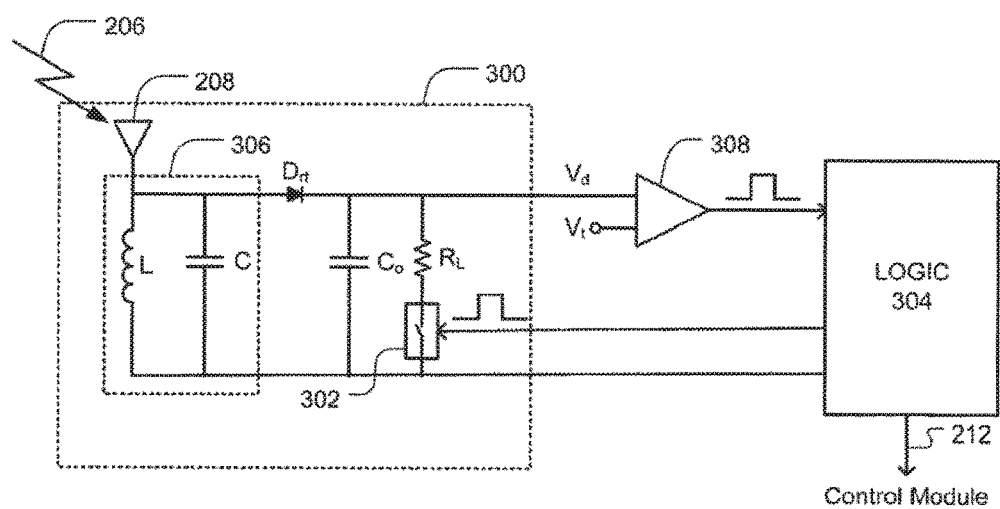
FIG. 3 illustrates one embodiment of a power sensor circuit for detecting the energy radiated by the electromagnetic signal transmitted by the mobile device.

FIG. 3 illustrates one embodiment of a power sensor circuit 300 for detecting the energy radiated by the electromagnetic signal 206 transmitted by the mobile device 200. The illustrated power sensor circuit 300 is one embodiment of a sensor module 216 described in connection with FIG. 2. The power sensor circuit 300 also converts the energy in the radiated electromagnetic signal 206 to a voltage potential indicative of the location of the mobile device 200. In the illustrated embodiment, the power sensor circuit 300 is not connected to the power source of the vehicle 100 or to a separate battery. Rather, the power sensor circuit 300 is one implementation of an energy harvester circuit which derives its power only from the energy radiated by the electromagnetic signal 206 transmitted by the mobile device 200. The electromagnetic signal 206 detected by the antenna 208 is filtered by tuning circuit 306 to match the most common frequency bands used by mobile devices. In one embodiment, the tuning circuit 306 may comprise an inductor L and a capacitor C selected to tune the power sensor circuit 300 to the desired frequency band. Those skilled in the art will appreciate that the tuning circuit may be implemented using digital or analog tuning techniques and therefore the embodiment disclosed in FIG. 3 is not limiting.

The diode $D_{rf}$ is an RF diode and acts to partially rectify the electromagnetic signal 206 received by the antenna 208 and tuned by the L-C circuit. The output of the RF diode charges a capacitor $C_o$ to a predetermined potential $V_d$. Thus, the power sensor circuit 300 converts the radiated electromagnetic signal 206 to a voltage potential $V_d$ that corresponds to the location of the mobile device 200 within the vehicle 100. With reference now to both FIGS. 2 and 3, when the voltage potential $V_d$ across the output capacitor $C_o$ exceeds a predetermined level, it indicates the presence of a mobile device 200 within the detection zone 220. The voltage potential $V_d$ is compared to a threshold voltage $V_t$ by a comparator 306. The threshold voltage $V_t$ is predetermined as the voltage level corresponding to the mobile device 200 being located in the detection zone 220. The output of the comparator 306 is provided to a detection logic module 304, which may be part of the detector module 202. The detection logic module 304 then generates a detection signal 212 and communicates the detection signal 212 to the control module 204. Upon receiving the detection signal 212, the control module 204 activates the jamming module 218 to interfere with the operation of the mobile device 200. As previously discussed, in certain embodiments, the jamming module 218 may be activated only if other logical conditions are met such as the state of the ignition system, the gear box, or other sensors.

Still with reference to FIGS. 2 and 3, it may be desirable to determine when to shut off the jamming module 218. Accordingly, in one embodiment, once the $V_d$ signal is provided to the control module 204, the detection logic module 304 activates a switch 302 to discharge the output capacitor $C_o$. Substantially at the same time, the jamming circuit 218 is turned off. If the mobile device 200 is still activated in the detection zone 220, the electromagnetic signal 208 would be picked up by the antenna 208 to charge the capacitor $C_o$ and generate a voltage potential $V_d$ to activate the jamming module 218. This cycle would be repeated until the mobile device 200 is either removed from the detection zone 220 such that the radiated electromagnetic signal 208 is too weak to activate the power sensor circuit 300 or the mobile device 200 is deactivated or shut off such that there is little or no radiated electromagnetic signal 208.

In the embodiment illustrated in FIG. 3, the tuning circuit 306 may be implemented to have a bandwidth encompassing the most popular cellular telephone frequencies. Since the tuning circuit 306 is fixed, it is tuned to a wide frequency band to receive electromagnetic signals 208 from about 0.8 to about 2 GHz, as shown in TABLE 1 below. In other embodiments, however, as described in connection with FIG. 4, the tuning circuit 306 may include a frequency band scanner to switch between multiple tuning elements and scan the detection zone 220 for multiple frequencies to more precisely tune the power sensor circuit 300 to the appropriate frequency band of the mobile device 200 located in the detection zone 220.

Figure 4:
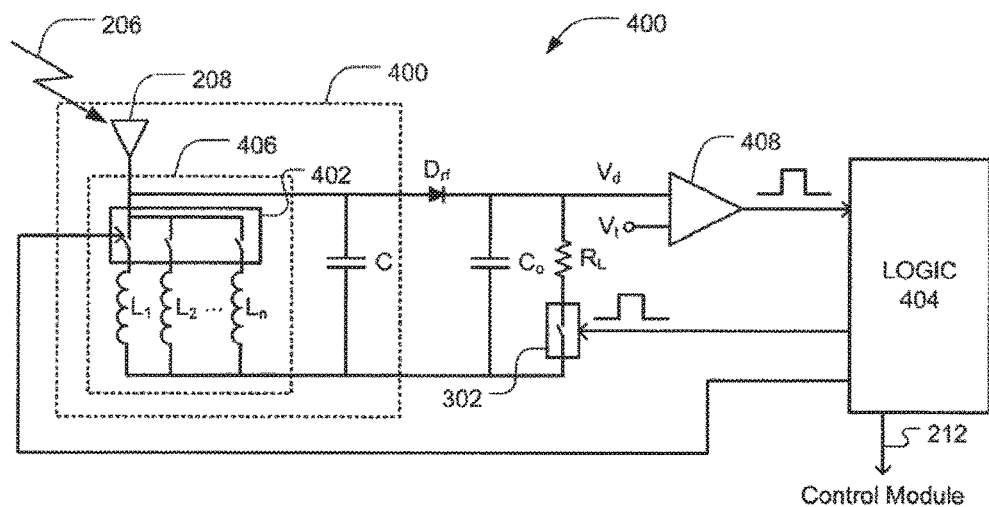
FIG. 4 illustrates one embodiment of a power sensor circuit comprising a tuning circuit with a scanner in series with the antenna.

FIG. 4 illustrates one embodiment of a power sensor circuit 400 comprising a tuning circuit 406 with a scanner 402 in series with the antenna 208. The scanner 402 is controlled by the logic module 404 and sweeps multiple frequency bands. With reference now to FIGS. 2-4, the logic module 404 periodically switches tuning elements $L_1$, $L_2$, $L_n$, into the tuning circuit 406 to monitor various frequency bands associated with the mobile device 200 located in the detection zone 220. The voltage potential $V_d$ is compared to a threshold voltage $V_t$ by a comparator 406. The threshold voltage $V_t$ is predetermined as the voltage level corresponding to the mobile device 200 being located in the detection zone 220. In other respects, the power sensor circuit 400 shown in FIG. 4 operates in a manner similar to the power sensor circuit 300 shown in FIG. 3.

Figure 5:
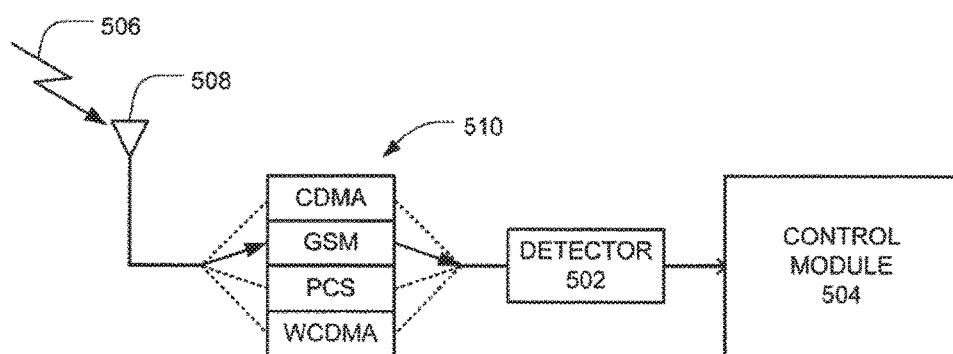
FIG. 5 illustrates a schematic diagram of a multi-band detector for monitoring uplink activity of the mobile device.

FIG. 5 illustrates a schematic diagram of a multi-band detector 500 for monitoring uplink activity of the mobile device 200. In the illustrated embodiment, the multi-band detector 500 provides high-speed scanning of cell phone uplink frequency bands for CDMA, GSM, PCS, and WCDMA. An uni-directional multi-band antenna 508 receives signals 506 from a mobile device located in the detection zone 220. A scanner 510 continuously scans CDMA, GSM, PCS, and WCDMA frequency bands for mobile devices 200 located in the detection zone 220 that are in active or idle state. A detector module 502 provides a detection signal 512 to the control module 504 for activating a jamming module when a signal 506 is detected, as previously discussed. The up-link frequencies covered by the multi-band detector 500 shown in FIG. 5 are listed in TABLE 1 below.

TABLE 1

| Air Interface | Frequency Band (MHz) |
| --- | --- |
| North America | |
| GSM-850, GSM-900, | 824-849 |
| CDMA, Cellular | 890-915 |
| GSM-1900/PCS-1900 | 1850-1910 |
| European Union/Asia/Australia | |
| E-GSM-900 | 880-915 |
| GSM 1800 (DCS-1800) | 1710.2-184.8 |
| WCDMA/UMTS | 1920-1980 |

The multi-band detector 500 may be implemented using a variety of components to detect radiated energy in the signal 506 received by the uni-directional multi-band antenna 508 and make RF power measurements at low levels by the detector module 502 in order to detect the presence of a mobile device 200 in the detection zone 220. The RF power level may be measured directly or may be sampled. Recently, a number of integrated RF power detectors have become available, intended for wireless networking and mobile telephone applications. Since these integrated circuits are produced in high-volume using integrated-circuit technology, they are consistent and inexpensive—often cheaper than typical microwave diodes, such as RF diode $D_{rf}$ shown in FIGS. 3 and 4. Many of them are specified for operation into the GHz region, covering several amateur microwave bands, and a few operate to 10 GHz and beyond.

In one embodiment, the RF power detector module 502 may be implemented with an LTC5508 integrated circuit from Linear Technologies rated up to 7 GHz, which is well within the bandwidth required for mobile devices frequency bands shown in TABLE 1. This integrated circuit requires operate a few milliamps at 3 to 5 volts and would be connected to the power supply of the vehicle or to a separate battery. An LT5534 logarithmic-amplifier type detector rated up to 3 GHz with 60 dB of dynamic range may be employed to amplify the RF power signal detected by the LTC5508 integrated circuit.

The multi-band detector 500 may be employed to measure RF power transmitted by the mobile device 200 and also antenna radiation pattern measurement. The sensitivity of the multi-band detector 500 may be useful for low-level power measurements as an "RF Sniffer" to detect RF leakage from the mobile device 200. The multi-band detector 500 provides fast response so that it may be used to detect modulation and to detect noise levels from the multi-band antenna 506.

Figure 6:
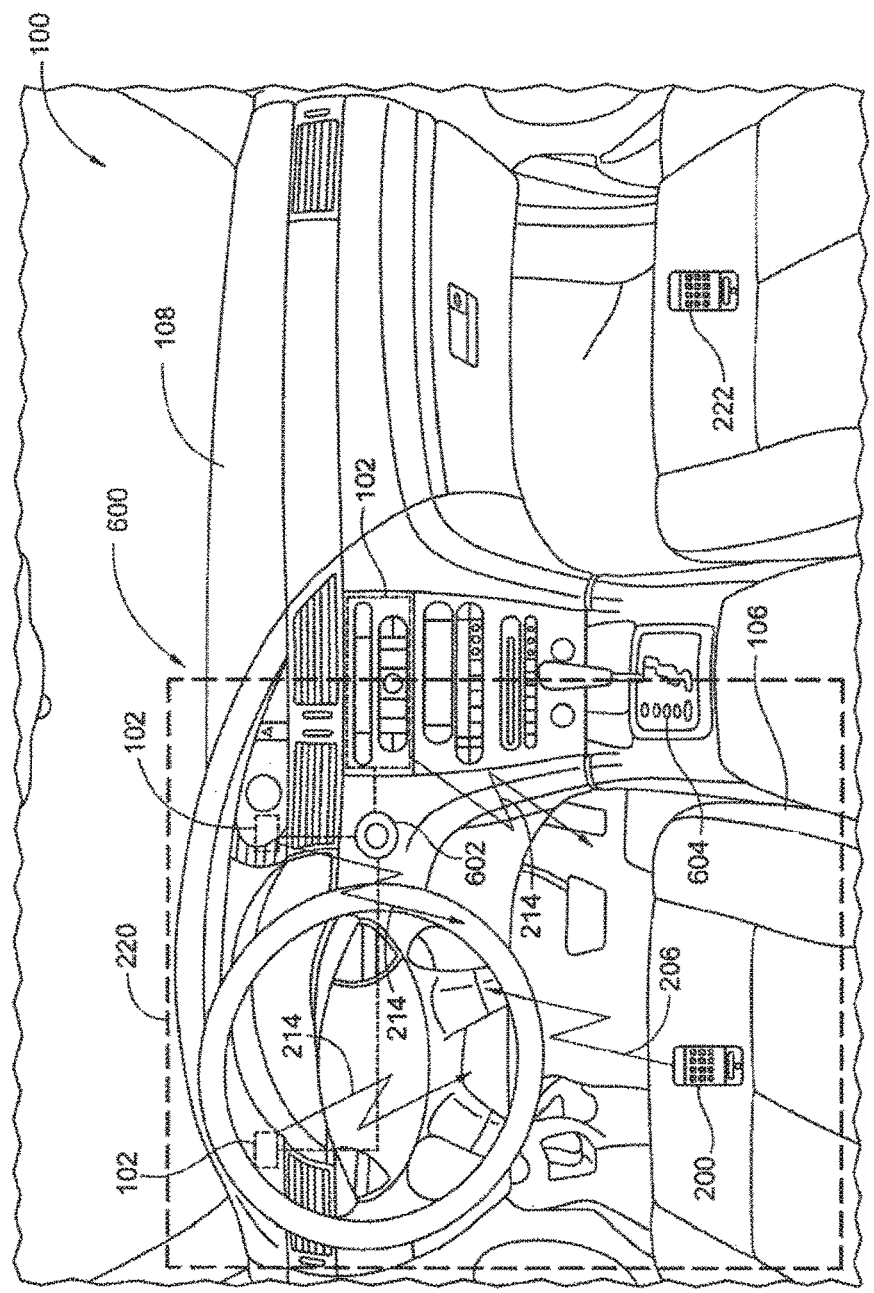
FIG. 6 illustrates an interior portion of the vehicle comprising one embodiment of the mobile device detection and control system located within the dashboard of the vehicle.

FIG. 6 illustrates an interior portion of the vehicle 100 comprising one embodiment of the mobile device detection and control system 102 located within the dashboard 108 of the vehicle 100. FIG. 6 illustrates three potential locations within the dashboard 108 where the mobile device detection and control system 102 can be located. It will be appreciated that the detection and control system 102 may be located in one or more of these locations on or within the dashboard 108. It would be preferable that the detection and control system 102 be located within the dashboard 108 to prevent user tampering. Accordingly, the detection and control system 102 is shown is phantom to indicate that the detection and control system 102 is located within the dashboard 108. In another embodiment, the control module 203 may be configured with a data collection process to record a situation when the detection and control system 102 was deactivated by an owner of the vehicle 100 with or without the help of a car mechanic. Such tamper recording and detection feature may be helpful in post accident investigations to determine if the detection and control system 102 was disabled and thus voiding insurance coverage, for example.

With reference now to FIGS. 1-6, the mobile device detection and control system 102 comprises a detector module 202 and a control module 204 coupled to the detector module 202. The detector module 202 detects the presence of a mobile device 200 within the detection zone 220 ("Discovery Umbrella"). When the detector module 202 detects the presence of a mobile device 200 within the detection zone 220, the control module 204 activates the jamming module 218, which transmits the control signal 214. The control signal 214 interferes with the operation of the mobile device 200 when it is located within the detection zone 220 without interfering with mobile devices 222 located outside the detection zone 220.

In one embodiment, the mobile device detection and control system 102 may be triggered when the driver enters the vehicle 100. Upon being triggered, the mobile device detection and control system 102 is initialized and goes into detection mode to establish a no-communication system ("NoCom system"). The detection mode is a process wherein the mobile device detection and control system 102, through one or more sensor(s) and logic detects the presence of all electromagnetic signals 206 such as RF, Wi-Fi, Cellular, and Satellite communications signals from the mobile device 200. In one embodiment, the detection process is initiated by the mobile device detection and control system 102, which is not dependent upon a driver's interaction to initiate the detection process. Decoupling the process from the driver, young and old, is advantageous because it avoids reliance on self policing, which currently has failed to work even with laws presently enacted. Thus, the triggering condition may be the activation of a switch such as the ignition switch 602 of the vehicle 100 or deactivation of a "park" sensor 604 of an automatic transmission of the vehicle 100, among other sensors.

Accordingly, upon ignition of the vehicle 100, the mobile device detection and control system 102 would initiate the detection process via logic that controls the operation of the detection module 202 and the control module 204. In accordance with the detection process, logic would instruct the sensor module 216 to initiate sensing or scanning for any type of communication signals 206 emitted by the mobile device 200 within the detection 220 within the driver side 106 area of the vehicle 100. In one embodiment, the sensor module 216 may be located within the dashboard 108 console and or within a microphone of a hands-free set. This configuration would hide the sensor module 216 and prevent drivers from tampering with the mobile device detection and control system 102 by blocking the sensor module 216 or prevent activation of the detection process. In one embodiment, the sensor module 216 may be coupled to the ignition 602 to render the vehicle 100 inoperable if the sensor module 216 is blocked.

The logic provides a detection process for detecting communication signals 206 emitted by the mobile device 200 located within the detection zone 220 to prevent the driver from adequately using the mobile device 200. The detection process will detect and take control of the driver side mobile device 200. The logic, however, will not prevent passengers from using their mobile devices 222 outside the detection zone 220.

Once the detection process is initiated, if the mobile device 200 is a smart phone and is detected within the detection zone 220, in one embodiment, the mobile device detection and control system 102 can automatically connect to the vehicle 100 hands-free communication system. If no hands-free communication system is available, the mobile device 200 would be disabled by the control signals 214 transmitted by the jamming module 218. Nevertheless, the mobile device detection and control system 102 would always allow emergency 911 calls.

Additionally, once the detection process is initiated, if the mobile device 200 is a smart phone and is detected within the detection zone 220, in one embodiment, the mobile device detection and control system 102 is configured to disable inbound/outbound text messaging features of the mobile device 200. In one embodiment, all inbound text messages would be saved as is the case currently. In one embodiment, the mobile device detection and control system 102 is configured through logic to read back the text via the Bluetooth/hands-free system as well as reply via voice activated text via the Bluetooth/hands-free communication system. In such an embodiment, the jamming module 216 may communicate with the mobile device 200 through a secondary channel, such as a Bluetooth wireless connection or any other connection that is secondary to the primary cellular communication channel. In some embodiments, the jamming module 216 may communicate only on the primary communication channel of the mobile device 200 or in addition to one or more secondary cellular communication channels.

Moreover, once the detection process is initiated, if the mobile device 200 is a smart phone and is detected within the detection zone 220, in one embodiment, the mobile device detection and control system 102 is configured to disable inbound/outbound emailing features. In one embodiment, all inbound emails would be saved as is the case currently. The mobile device detection and control system 102 is configured through the logic module to read back the email via the Bluetooth/hands-free system as well as reply via voice activated email via the Bluetooth/hands-free communication system.

Furthermore, once the detection process is initiated, if the mobile device 200 is an iPad® or a Netbook® device and is detected within the detection zone 220, in one embodiment, the mobile device detection and control system 102 is configured to disable inbound/outbound text messaging/emailing features. All inbound emails would be saved as is the case currently. The mobile device detection and control system 102 is configured through the logic module to read back the email/text via the Bluetooth/hands-free system as well as reply via voice activated email/text via the Bluetooth/hands-free communication system.

Figure 7:
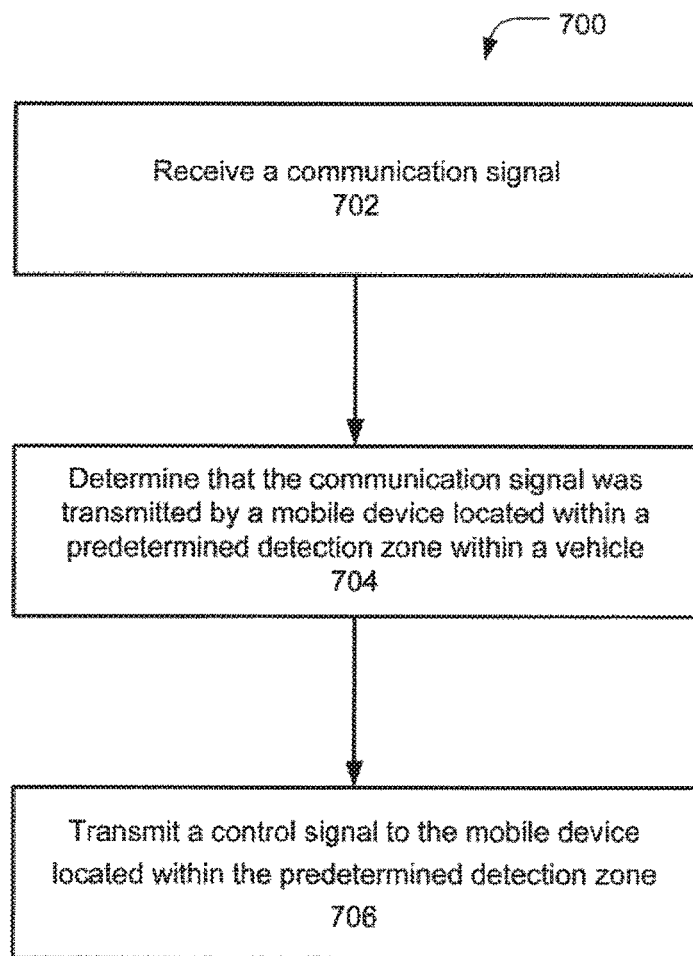
FIG. 7 illustrates one embodiment of a logic diagram for determining the presence of a mobile device located in a predetermined detection zone within a vehicle.

FIG. 7 illustrates one embodiment of a logic diagram 700 for determining the presence of a mobile device located in a predetermined detection zone within a vehicle. With reference now to FIGS. 1-7, in one embodiment, the detection module 202 receives 702 a communication signal 206. The detection mule 202 determines 704 that the communication signal 206 was transmitted by a mobile device 200 located within a predetermined detection zone 220 within a vehicle 100. The control module 204 transmits 706 a control signal 214 to the mobile device 200 located within the predetermined detection zone 220.

In one embodiment, the detection module 202 transmits a detection signal 212 to the control module 204 when a voltage potential $V_d$ substantially equals a predetermined threshold value $V_t$, wherein the voltage potential of the predetermined threshold value $V_t$ indicates the presence of the mobile device 200 within the predetermined detection zone 220.

In one embodiment, the detection module 202 scans for a plurality frequency bands associated with the mobile device 200. The radiated power level of the communication signal 206 in the plurality of frequency bands received by the detection module 202 are monitored by the detection module 202. The detection module 202 transmits a detection signal 212 to the control module 204 when the measured radiated power level substantially equals at least predetermined value $V_t$.

In one embodiment, the detection module 202 harvests the energy in the received communication signal 206 and generates a voltage potential corresponding to the location of the mobile device 200 within the detection zone 220.

In one embodiment, the control module 204 monitors a functional system of the vehicle 100. The transmission of the control signal 214 is activated when the monitored functional system is activated and the detection module 202 determines that the communication signal was transmitted by the mobile device 200 located within the predetermined detection zone 220. In one embodiment, the functional system of the vehicle 100 is any one of an ignition system 224, a transmission system 226, and a sensor 228.

In one embodiment, when the control module 204 receives the detection signal 212, the control module 204 either jams the mobile device 200, jams at least one function of the mobile device 200, or redirects the operation of the mobile device 200 to a hands-free alternate system.

In various embodiments, the mobile device 200 may be configured to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.1a/b/g/n series of standard protocols and variants (also referred to as "WFi"), the IEEE 802.16 series of standard protocols and variants (also referred to as "WiMAX"), the IEEE 802.20 series of standard protocols and variants, and so forth. Additionally, the mobile device 200 may utilize different types of shorter range wireless systems, such as a Bluetooth system operating in accordance with the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

The various illustrative functional elements, logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format.

The functions of the various functional elements, logical blocks, modules, and circuits elements described in connection with the embodiments disclosed herein may be performed through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, DSP hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The various functional elements, logical blocks, modules, and circuits elements described in connection with the embodiments disclosed herein may comprise a processing unit for executing software program instructions to provide computing and processing operations for the mobile device detection and control system 102. The processing unit may be responsible for performing various voice and data communications operations between the mobile device 200 and the hands-free system. Although the processing unit may include a single processor architecture, it may be appreciated that any suitable processor architecture and/or any suitable number of processors in accordance with the described embodiments. In one embodiment, the processing unit may be implemented using a single integrated processor.

The functions of the various functional elements, logical blocks, modules, and circuits elements described in connection with the embodiments disclosed herein may be implemented in the general context of computer executable instructions, such as software, control modules, logic, and/or logic modules executed by the processing unit. Generally, software, control modules, logic, and/or logic modules include any software element arranged to perform particular operations. Software, control modules, logic, and/or logic modules can include routines, programs, objects, components, data structures and the like that perform particular tasks or implement particular abstract data types. An implementation of the software, control modules, logic, and/or logic modules and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, control modules, logic, and/or logic modules may be located in both local and remote computer storage media including memory storage devices.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

It is worthy to note that any reference to "one embodiment" or "an embodiment" means that a particular feature, structure, or characteristic described in connection with the embodiment is included in at least one embodiment. The appearances of the phrase "in one embodiment" or "in one aspect" in the specification are not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are included within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present disclosure, therefore, is not intended to be limited to the exemplary aspects and aspects shown and described herein. Rather, the scope of present disclosure is embodied by the appended claims.

The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as", "in the case", "by way of example") provided herein is intended merely to better illuminate the invention and does not pose a limitation on the scope of the invention otherwise claimed. No language in the specification should be construed as indicating any non-claimed element essential to the practice of the invention. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the disclosed embodiments.

What is claimed is:

1. A system for determining a presence of a mobile device located in a predetermined detection zone of a vehicle, the system comprising:
    a plurality of detection/control systems, each of the plurality of the detection/control systems comprising:
        a transmitter configured to transmit a probing signal within the vehicle;
        a detection module comprising a sensor and configured to receive a return signal from the mobile device located within the vehicle in response to the mobile device receiving the probing signal and determine that the mobile device is located within a predetermined detection zone of the vehicle, wherein the predetermined detection zone is defined as a three-dimensional zone in or in proximity of a driver seat side of a vehicle; and
        a control module coupled to the detection module, the control module configured to transmit the control signal to the mobile device located within the predetermined detection zone when the return signal indicates the mobile device received the probing signal at or above a predetermined signal strength corresponding to the mobile device being located within the predetermined detection zone,
    wherein at least one of the plurality of detection/control systems is configured to transmit the probing signal within the vehicle, and
    wherein at least one of the plurality of detection/control systems is configured to transmit the control signal to the mobile device when the mobile device is located within the predetermined zone of the vehicle; wherein each of the plurality of detection/control systems further comprises a scanner coupled to the detection module and configured to sweep for a plurality of frequency bands associated with the mobile device.

2. The system of claim 1, wherein each of the plurality of detection/control systems further comprises a power sensor circuit configured to monitor a radiated power level of the return signal received by the detection module in each of the plurality frequency bands.

3. The system of claim 1, wherein each of the plurality of detection/control systems further comprises a monitoring logic to monitor a functional system of the vehicle activating the transmission of the control signal by the control module when the monitored functional system is activated and the detection module determines that the return signal was transmitted by the mobile device located within the predetermined detection zone.

4. The system of claim 3, wherein the functional system of the vehicle is any one of an ignition system, a transmission system, and a sensor.

5. A system for determining a presence of a mobile device located in a predetermined detection zone of a vehicle, the system comprising:
    a plurality of detection/control systems, each of the plurality of the detection/control systems comprising:
        a detection module comprising a sensor and configured to receive a signal from the mobile device located within the vehicle and determine that the mobile device is located within a predetermined detection zone of the vehicle, wherein the predetermined detection zone is defined as a three-dimensional zone in or in proximity of a driver seat side of a vehicle; and
        a control module coupled to the detection module, the control module configured to transmit a control signal to the mobile device located within the predetermined detection zone when the signal is at or above a predetermined signal strength corresponding to the mobile device being located within the predetermined detection zone
wherein at least one of the plurality of detection/control systems is configured to transmit the control signal to the mobile device when the mobile device is located within the predetermined zone of the vehicle; wherein each of the plurality of detection/control systems further comprises a scanner coupled to the detection module and configured to sweep for a plurality of frequency bands associated with the mobile device.

6. The system of claim 5, wherein each of the plurality of detection/control systems further comprises:
a power sensor circuit operatively coupled to the detection module and configured to detect the energy radiated by the signal and to convert the energy radiated by the signal to a voltage potential; and
a logic module coupled to the power sensor circuit and configured to receive a signal indicative of the location of the mobile device and to transmit a detection signal to the control module when the voltage potential substantially equals a predetermined value,
wherein the predetermined value corresponds to an indication of the presence of the mobile device within the predetermined detection zone.

7. The system of claim 5, wherein each of the plurality of detection/control systems further comprises an energy harvester configured to harvest the energy in the received signal and to generate a voltage potential corresponding to the location of the mobile device within the detection zone.

8. A method for determining a presence of a mobile device located in a predetermined detection zone within a vehicle, the method comprising:
providing a plurality of detection/control systems, each of the plurality of the detection/control systems comprising:
a detection module comprising a sensor module configured to receive a signal from a mobile device and convert the signal into an electrical signal corresponding to a location of the mobile device; and
a controller module, comprising a transmitter;
transmitting, by a transmitter of at least one of the plurality of detection/control systems, a probing signal to the mobile device;
receiving, by a detection module of the at least one of the plurality of detection/control systems, a return signal from the mobile device;
determining, by a controller of the at least one of the plurality of detection/control systems, a location of the mobile device based on the return signal from the mobile device;
transmitting, by the transmitter of the at least one of the plurality of detection/control systems, at least one control signal to the mobile device when the location of the mobile device is determined to be within the predetermined detection zone;
receiving, by the mobile device, the at least one control signal; and
disabling, by the mobile device, at least one mobile device function upon receipt of the at least one control signal.

9. The method of claim 8, wherein receiving, by a detection module of the at least one of the plurality of detection/control systems, an return signal from the mobile device comprises receiving, by a detection module of each of the plurality of detection/control systems, an return signal from the mobile device.

10. The method of claim 8, further comprising transmitting, by a detection module of the at least one of the plurality of detection/control systems, a detection signal to the controller module of the at least one of the plurality of detection/control systems when the return signal indicates the mobile device received the probing signal at or above a predetermined signal strength corresponding to the mobile device being located within the predetermined detection zone.

11. The method of claim 8, wherein receiving, by the detection module of the at least one of the plurality of detection/control systems, a return signal from the mobile device comprises receiving, by the detection module of the at least one of the plurality of detection/control systems, a signal from the mobile device indicating the location of the mobile device within the vehicle.

12. The method of claim 11, wherein receiving, by the detection module of the at least one of the plurality of detection/control systems, a return signal from the mobile device comprises receiving, by the detection module of the at least one of the plurality of detection/control systems an echo signal reflected by the mobile device.

13. The method of claim 11, receiving, by the detection module of the at least one of the plurality of detection/control systems, a return signal from the mobile device comprises receiving, by the detection module of the at least one of the plurality of detection/control systems a response signal transmitted by the mobile device.

14. The method of claim 8, further comprising:
monitoring, by the control module of the at least one of the plurality of detection/control systems, a functional system of the vehicle; and
transmitting, by the control module of the at least one of the plurality of detection/control systems, the control signal when the monitored functional system of the vehicle is activated and the detection module of the at least one of the plurality of detection/control systems determines that the signal was transmitted by the mobile device located within the predetermined detection zone.

15. The method of claim 8, wherein disabling, by the mobile device, at least one mobile device function comprises disabling, by the mobile device, a texting function.

16. A method for determining a presence of a mobile device located in a predetermined detection zone within a vehicle, the method comprising:
providing a plurality of detection/control systems, each of the plurality of the detection/control systems comprising:
a detection module comprising a sensor module configured to receive a signal from a mobile device and convert the signal into an electrical signal corresponding to a location of the mobile device; and
a controller module, comprising a transmitter;
transmitting, by the mobile device, a signal;
receiving, by a sensor module of at least one of the detection/control systems, the signal from the mobile device;
determining, by a controller of the at least one detection/control system, a location of the mobile device based on the signal received from the mobile device;
transmitting, by a transmitter of the at least one detection/control system, at least one control signal to the mobile device when the location of the mobile device is determined to be within the predetermined detection zone;
receiving, by the mobile device, the at least one control signal; and disabling, by the mobile device, at least one mobile device function upon receipt of the at least one control signal.

17. The method of claim 16, further comprising:
scanning, by the detection module of the at least one detection/control system, a plurality of frequency bands associated with the mobile device; and
monitoring, by the detection module of the at least one detection/control system, a radiated power level of the signal received by the detection module of the at least one detection/control system in each of the plurality frequency bands.

18. The method of claim 16, further comprising transmitting by the detection module of the at least one detection/control system a detection signal to the control module of the at least one detection/control system when a voltage potential equals a predetermined value, wherein the predetermined value indicates the presence of the mobile device within the predetermined detection zone.

19. The method of claim 16, further comprising:
monitoring, by the control module of the at least one detection/control system, a functional system of the vehicle; and
activating the transmission of the control signal by the control module of the at least one detection/control system when the monitored functional system is activated and the detection module of the at least one detection/control system determines that the communication signal was transmitted by the mobile device located within the predetermined detection zone.

* * * * *